(12) United States Patent
Endo et al.

(10) Patent No.: US 9,364,774 B2
(45) Date of Patent: Jun. 14, 2016

(54) CHAIN STRUCTURE

(71) Applicant: Hitachi Metals Techno, Ltd., Tokyo (JP)

(72) Inventors: Minetaka Endo, Kumagaya (JP); Suguru Ishii, Tokyo (JP)

(73) Assignee: SENQCIA CORPORATION, Tokyo (JP)

( * ) Notice: Subject to any disclaimer, the term of this patent is extended or adjusted under 35 U.S.C. 154(b) by 264 days.

(21) Appl. No.: 14/013,202

(22) Filed: Aug. 29, 2013

(65) Prior Publication Data
US 2015/0065281 A1 Mar. 5, 2015

(51) Int. Cl.
| | | |
|---|---|---|
| *B01D 21/18* | (2006.01) | |
| *B01D 21/04* | (2006.01) | |
| *B01D 21/24* | (2006.01) | |
| *F16G 13/06* | (2006.01) | |
| *B65G 17/38* | (2006.01) | |
| *B65G 19/22* | (2006.01) | |
| *B01D 21/00* | (2006.01) | |

(52) U.S. Cl.
CPC ............ *B01D 21/04* (2013.01); *B01D 21/0003* (2013.01); *B01D 21/18* (2013.01); *B01D 21/2455* (2013.01); *B65G 17/38* (2013.01); *B65G 19/22* (2013.01); *F16G 13/06* (2013.01)

(58) Field of Classification Search
CPC .... B01D 21/0003; B01D 21/04; B01D 21/12; B01D 21/18; B01D 21/20; B01D 21/2455; B65G 17/38; B65G 19/22; F16G 13/06; F16H 7/06
USPC .......... 210/526, 541, 803; 198/729, 835, 850; 474/206, 226, 229, 231
See application file for complete search history.

(56) References Cited

U.S. PATENT DOCUMENTS

| | | | | |
|---|---|---|---|---|
| 694,533 | A * | 3/1902 | Cross | 198/850 |
| 1,535,386 | A * | 4/1925 | Walker | B65G 19/22 198/719 |
| 2,865,509 | A * | 12/1958 | Harlan | B01D 21/04 210/526 |
| 3,099,346 | A * | 7/1963 | Maas | B65G 17/38 198/722 |
| 5,511,649 | A * | 4/1996 | Wilcher | B01D 21/245 210/526 |
| 5,545,324 | A * | 8/1996 | Workman | B01D 21/18 210/526 |
| 6,220,455 | B1 * | 4/2001 | Tuomikoski | B01D 21/20 210/526 |
| 2005/0187055 | A1 * | 8/2005 | Morishige | F16G 13/04 474/206 |

FOREIGN PATENT DOCUMENTS

JP 2002-273105 9/2002

* cited by examiner

*Primary Examiner* — Christopher Upton
(74) *Attorney, Agent, or Firm* — Bacon & Thomas, PLLC

(57) ABSTRACT

An object of the present invention is to provide a chain structure which has a simple construction and can prevent a chain from being detached from a gear tooth of a sprocket wheel due to a great wave force and prevent the chain and a flight plate from dropping so as to break members of the chain and the flight plate and the other portions of the chain structure. For accomplishing the object in a chain structure (40) provided with a sprocket wheel (6) in which a plurality of gear teeth capable of engaging with a chain (42) are formed in an outer peripheral portion, and the chain (42) in which a pair of side plate members (18, 20, 44) facing to each other are coupled in an endless manner at plural sets in a length direction.

8 Claims, 20 Drawing Sheets

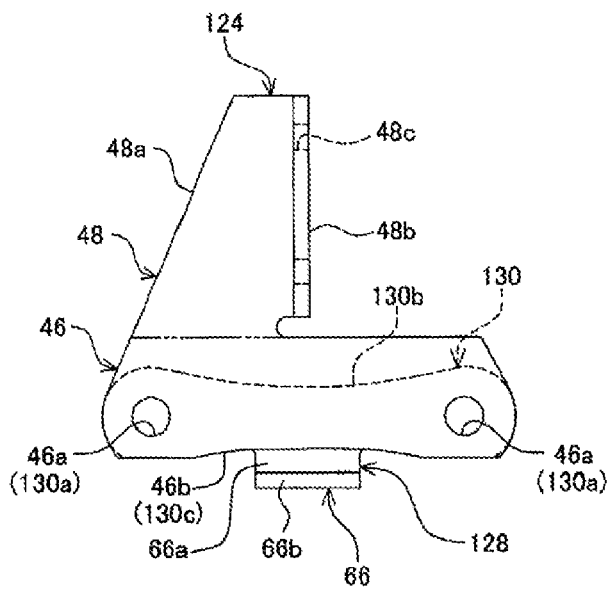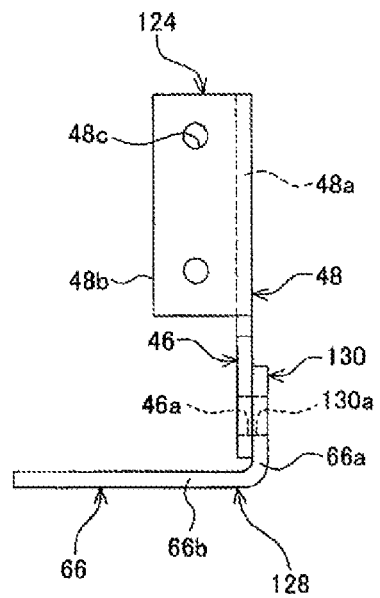

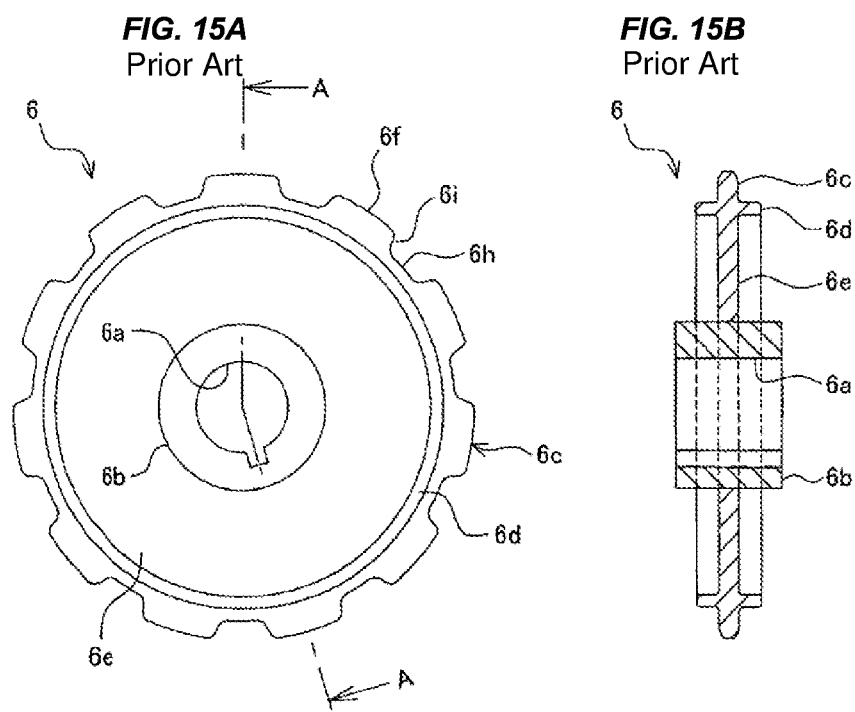

CHAIN STRUCTURE

BACKGROUND OF THE INVENTION

1. Field of the Invention

The present invention relates to a chain structure, for example, employed in a sludge scraper which is provided in a settling pond of a sewage disposal facility.

2. Description of the Conventional Art

The sludge scraper is provided within a sewage disposal tank in a first settling pond or a final settling pond of the sewage disposal facility, and is structured such as to scrape the sludge constituted by various components which are piled up in a bottom of the sewage disposal tank to one side in the bottom of the sewage disposal tank by a sludge scraping plate. The sludge scraped by the sludge scraper as mentioned above is sucked out by a pump, and is carried out to a treatment facility in the next step in an outer portion of the sewage disposal tank.

FIGS. 14 to 18 are views which are referred for describing a conventional chain structure 2 which is used in the sludge scraper installed within the sewage disposal tank.

The conventional chain structure 2 is structured, as shown in FIG. 14, such as to have a drive sprocket wheel 6, driven sprocket wheels 8, 10 and 12, an endless chain 4 which is wound around the sprocket wheels 6, 8, 10 and 12, and a plurality of flight plates 14 (sludge scraping plates) which are provided so as to protrude to an outer side at predetermined distances in a length direction of the chain 4 (refer to Japanese Unexamined Patent Publication No. 2002-273105).

In FIG. 14, the chain 4 and the sprocket wheels 6, 8, 10 and 12 are shown only one set, however, individual parts of the other set of chain 4 and sprocket wheels 6, 8, 10 and 12 having the same structures are provided at a position which is away from each other in a vertical direction to a paper surface in the drawing, in inner sides of side surfaces facing to each other of a sewage disposal tank 3 so as to face to each other.

Further, since each of the flight plates 14 is fixed in its inner side in a width direction in its both end portions to an outer peripheral side of each of a pair of chains 4, the flight plate 14 is circularly moved in an outer side of the chain 4 integrally with the chain 4 in conformity to a circular movement of the chain 4 in a length direction (a clockwise direction in FIG. 14), on the basis of a rotating motion of the drive sprocket wheel 6.

Then, the flight plates 14 move in a direction of a leftwards arrow in the drawing so as to be along a bottom surface 3a of the sewage disposal tank 3 when the flight plates 14 moves in a lower portion in FIG. 14, and scrape and collect the sludge piled up on the bottom surface 3a to a sludge storage portion 3b in a left end portion side in the drawing.

The sprocket wheel 6 of the conventional chain structure 2 mentioned above has been constructed, as shown in FIG. 15B, by a cylindrical boss portion 6b which has a shaft hole 6a penetrating in an axial direction (a lateral direction in the drawing), and a disc portion 6e which is arranged in a center portion in the axial direction of the boss portion 6b and forms a gear tooth forming portion 6c in an outer peripheral portion in a radial direction (a vertical direction in the drawing).

Further, an annular projection portion 6d is integrally formed in an inner side in the radial direction than the gear tooth forming portion 6c in the disc portion 6e of the sprocket wheel 6. The annular projection portion 6d has a height toward outer sides in a thickness direction from the disc portion 6e, has its axis in common with the axis of the shaft hole 6a and is formed as a circular ring shape.

Further, as shown in FIG. 15A, in the gear tooth forming portion 6c of the sprocket wheel 6, a tooth top portion 6f (a convex portion) and a tooth bottom portion 6h (a concave portion) are alternately formed in a circumferential direction of the gear tooth forming portion 6c via an engagement portion 6i of these step portions.

The sprocket wheel 6 is structured, as shown in FIG. 17, such that a rotating shaft 16 attached to the shaft hole 6a so as to be relatively non-rotatable via a key 17 is driven by a drive device, for example, a motor (not shown) so as to rotate around an axis thereof.

The chain 4 is structured, as shown in FIG. 16, such that a pair of inner link plates 18 and a pair of outer link plates 20 are alternately coupled in a length direction, however, a pair of link plates 26 with attachments (corresponding to a side plate member) integrally provided with attachments 28 (a flight plate attaching portion) are coupled at appropriate distances, as shown in FIG. 17.

The link plate 26 is structured such that the flight plate 14 formed as an approximately C-shaped form in its cross sectional shape is fixed to the attachment 28 via a spacer 30 by a screw fastening means using bolts and nuts.

Further, the conventional chain structure is structured, as shown in FIG. 18, such that a pair of chains 4 provided with the attachments 28 as mentioned above are respectively wound around a pair of sprocket wheels 6 which are arranged at positions which are away from each other in a lateral direction of the drawing so as to be faced to each other. Further, a pair of chains 4 are respectively wound around a pair of sprocket wheels 8, 10 and 12 one of which is shown in FIG. 14.

A plurality of flight plates 14 are provided as mentioned above in a pair of chains 4 and 4 which are arranged so as to be faced to each other at predetermined distances in a length direction thereof. The flight plate 14 is formed as a long shape having a length in an approximately vertical direction to the length direction of the chain 4, that is, a vertical direction to a paper surface in FIG. 14, and both end portions in the length direction are respectively attached to respective outer peripheral sides of a pair of chains 4 and 4.

Further, the flight plate 14 is structured, as shown in FIG. 18, such that shoes 36 and 37 are respectively fixed to an upper portion and a lower portion of the drawing in both end portions in the length direction.

Among the shoes 36 and 37, the shoe 36 provided in the lower portion in FIG. 18 of the flight plate 14 is structured such that the shoe 36 comes into contact with an upper surface of a rail member 32 which is provided on a rail support member 34 extending in a horizontal direction to the sprocket wheel 6 side from a vertical wall surface (not shown) in the sewage disposal tank 3 and guides the flight plate 14 along the rail member 32, when the flight plate 14 moves in the upper portion in FIG. 14.

On the other hand, the shoe 37 provided in the upper portion in FIG. 18 of the flight plate 14 is structured such that the shoe 37 comes into contact with an upper surface of a pond bottom rail (not shown) which is provided on the bottom surface 3a of the sewage disposal tank 3 and guides the flight plate 14 along the pond bottom rail, when the flight plate 14 moves in the lower portion in FIG. 14.

Further, as shown in FIG. 18, a pair of sprocket wheels 6 arranged so as to face to each other are provided with a single rotating shaft 16 which is attached to each of the shaft holes 6a so as to be relatively non-rotatable via the key 17 as shown in FIG. 17. The rotating shaft 16 is driven by the drive device, for example, the motor (not shown), and rotates a pair of sprocket wheels 6 so as to be synchronous with each other.

SUMMARY OF THE INVENTION

Problem to be Solved by the Invention

However, in the conventional chain structure 2, in the case that the water within the sewage disposal tank 3 is swung by a great earthquake so as to generate a great wave, and the great wave is applied to the chain 4 and the flight plate 14, the chain 4 and the flight plate 14 are relatively displaced in a vertical direction or a horizontal direction in relation to the sprocket wheel 6. Accordingly, the engagement between the chain 4 and the gear tooth, for example, the sprocket wheel 6 is released, so that there is a risk that the chain 4 and the flight plate 14 drop so as to be broken, or the other portions of the chain structure 2 are broken by the drop and collision of the chain 4 and the flight plate 14.

Accordingly, the present invention is made by taking the problem mentioned above into consideration, and an object of the present invention is to provide a chain structure which has a simple construction and can prevent a chain from being detached from a gear tooth of a sprocket wheel due to a great wave force and prevent the chain and a flight plate from dropping so as to break members of the chain and the flight plate and the other portions of the chain structure.

Means for Solving the Problem

In order to solve the problem mentioned above, according to the present invention, there is provided a chain structure comprising:

a sprocket wheel in which a plurality of gear teeth capable of engaging with a chain are formed in an outer peripheral portion; and the chain in which a pair of side plate members facing to each other are coupled in an endless manner at plural sets in a length direction, and which is wound around gear teeth in the outer peripheral portion of the sprocket wheel, wherein a drop preventing means for preventing the side plate member from dropping from a wound state to the sprocket wheel is provided in at least a part of the plural sets of the side plate members.

Further, the chain structure according to the present invention is structured such that the drop preventing means is constructed by a protruding plate portion which is parallel to a radial direction of the sprocket wheel.

Further, the chain structure according to the present invention is structured such that the drop preventing means is constructed by a protruding plate portion which is vertical to a radial direction of the sprocket wheel.

Further, the chain structure according to the present invention is structured such that the drop preventing means is provided in a side plate member having a flight plate attaching portion.

Further, the chain structure according to the present invention is structured such that two sets of chain structures are arranged in inner sides of a pair of surfaces facing to each other within a liquid tank so as to be faced to each other, and the drop preventing means is provided only in surfaces which face to each other of a pair of sprocket wheels arranged so as to be faced to each other, or only in surfaces in an opposite side to the surfaces which face to each other.

Effect of the Invention

According to the chain structure of the present invention mentioned above, in the chain structure provided with the sprocket wheel in which a plurality of gear teeth capable of engaging with the chain are formed in an outer peripheral portion, and the chain in which a pair of side plate members facing to each other are coupled in an endless manner at the plural sets in the length direction, and which is wound around the gear teeth in the outer peripheral portion of the sprocket wheel, the drop preventing means for preventing the side plate member from dropping from the wound state to the sprocket wheel is provided in at least a part of the plural sets of the side plate members. Therefore, the structure is simple, and it is possible to prevent the chain and the flight plate from being detached from the gear tooth of the sprocket wheel due to the great wave force and prevent the chain and a flight plate from dropping so as to break the members of the chain and the flight plate and the other portions of the chain structure.

BRIEF EXPLANATION OF THE DRAWINGS

FIGS. 3A and 3B are views showing a link plate 44 shown in FIG. 1, in which FIG. 3A is a front elevational view of the same, and FIG. 3B is a right elevational view of the same;

FIGS. 7A and 7B are views showing a link plate 64 shown in FIG. 5, in which FIG. 7A is a front elevational view of the same, and FIG. 7B is a right elevational view of the same;

FIGS. 12A and 12B are views showing a link plate 124 and a protruding plate member 126 shown in FIG. 11, in which FIG. 12A is a front elevational view of the same, and FIG. 12B is a right elevational view of the same;

FIGS. 13A and 13B are views showing the link plate 124 and a protruding plate member 128 shown in FIG. 11, in which FIG. 13A is a front elevational view of the same, and FIG. 13B is a right elevational view of the same;

FIGS. 15A and 15B are views showing a sprocket wheel 6 shown in FIG. 14, in which FIG. 15A is a front elevational view of the same, and FIG. 15B is a cross sectional view as seen from an arrow A-A in FIG. 15A;

FIGS. 16A and 16B are views showing a conventional chain 4 shown in FIG. 14, in which FIG. 16A is a partly enlarged top elevational view of the same, and FIG. 16B is a partly enlarged front elevational view of the same;

DETAILED DESCRIPTION OF PREFERRED EMBODIMENTS

Figure 1:
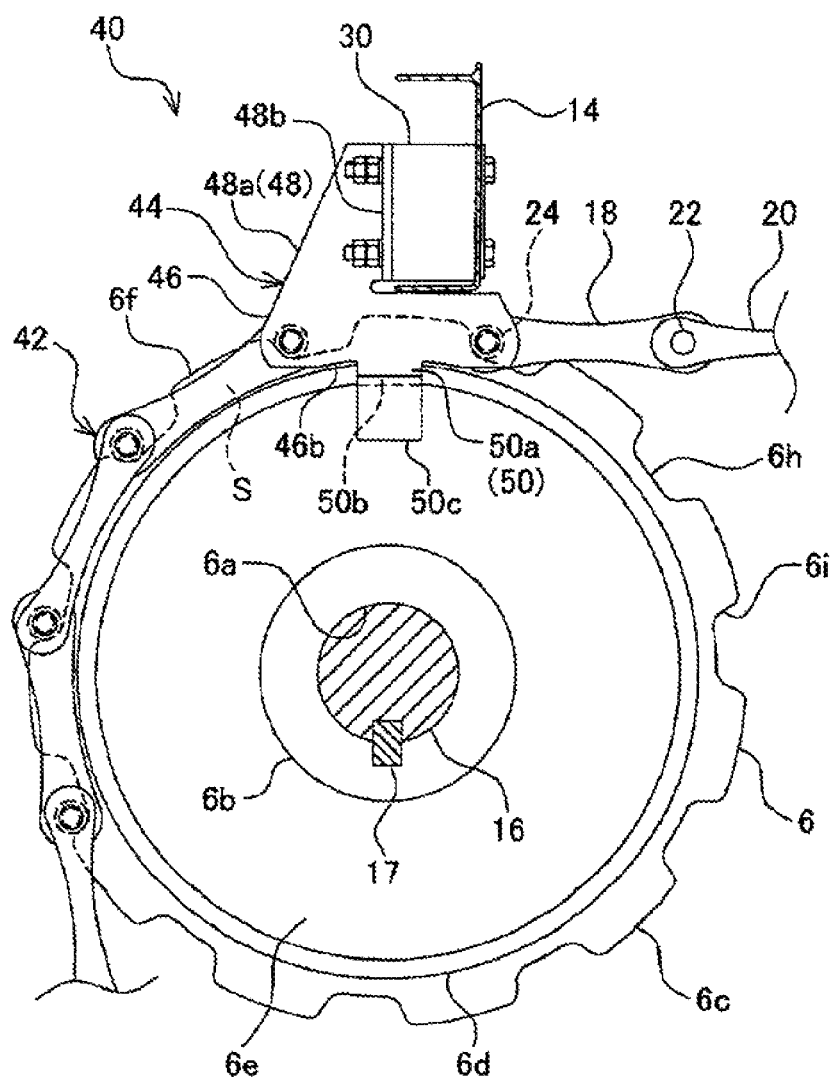
FIG. 1 is a front elevational view with a partial cross section showing a sprocket wheel 6 and its vicinity in a chain structure 40 according to a first embodiment of the present invention.

A description will be specifically given below of modes for carrying out a chain structure according to the present invention with reference to the accompanying drawings.

FIGS. 1 to 4 and 14 are views which are referred for describing a chain structure 40 according to a first embodiment of the present invention. A description will be given by attaching the same reference numerals to the same portions as those of the conventional chain structure 2, and an overlapping description about the same structures as those of the conventional one will be omitted except a part thereof.

Figure 2:
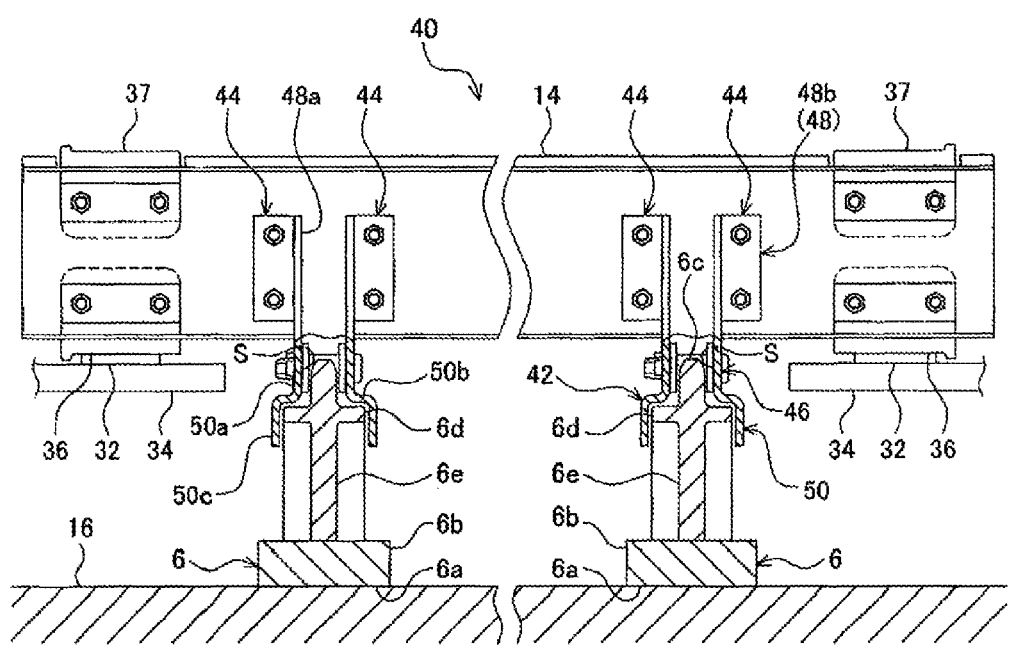
FIG. 2 is a side elevational view with a partial cross section showing in a partly broken manner a part of the chain structure 40 shown in FIG. 1, and is a view of the chain structure 40 as seen from a left side of FIG. 1.
Figure 17:
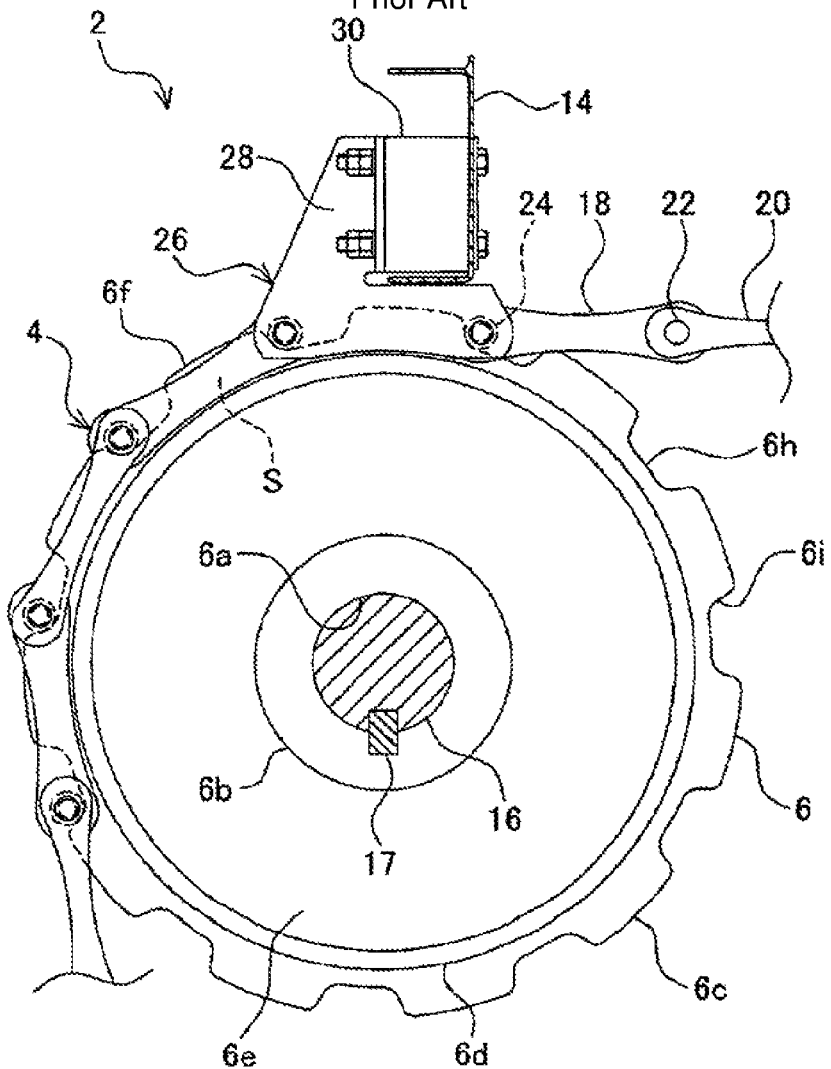
FIG. 17 is a front elevational view with a partly cross section showing a sprocket wheel 6 shown in FIG. 14 and its vicinity in a partly broken manner.
Figure 18:
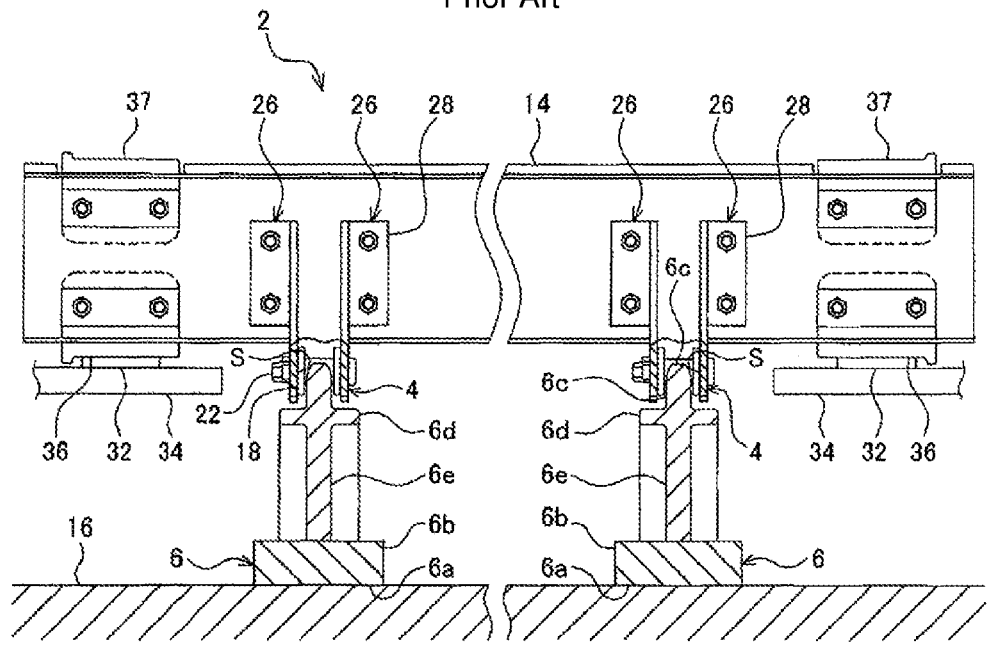
FIG. 18 is a view of a chain structure 2 shown in FIG. 17 as seen from a left side of the drawing, and is a side elevational view with a partly cross section showing in a partly broken manner.

A chain 42 in the chain structure 40 according to the present invention is significantly different from the conventional chain structure 2 in a point that a link plate 44 is provided as shown in FIGS. 1 and 2, in place of the link plate 26 (refer to FIG. 17) of the chain 4 in the conventional chain structure 2.

Figure 14:
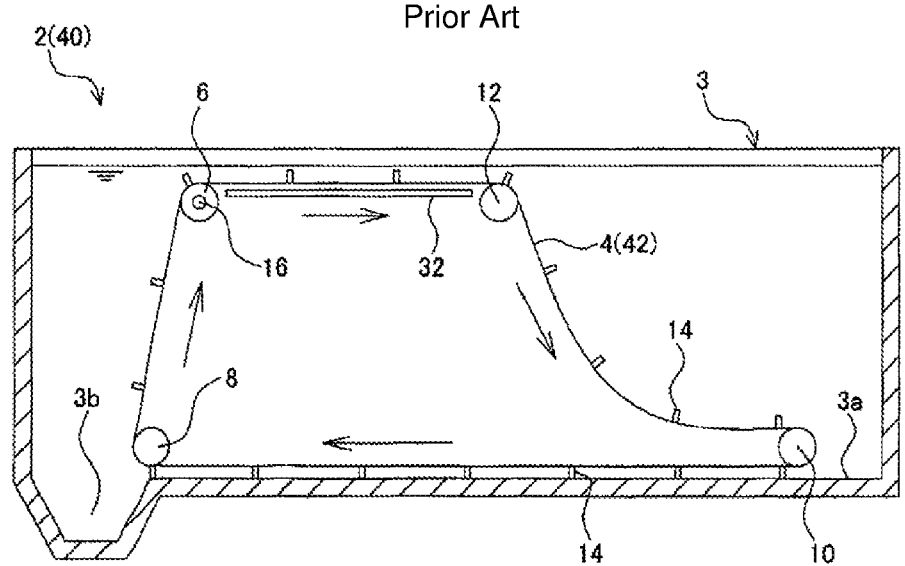
FIG. 14 is a schematic cross sectional view showing a whole structure of conventional chain structures 2 and 40 which are provide in a sludge scraper within a sewage disposal tank 3.

In other words, the chain structure 40 according to the present embodiment is structured, as shown in FIG. 14, such as to have a drive sprocket wheel 6, driven sprocket wheels 8, 10 and 12, an endless chain 42 which is wound around these four sprocket wheels, and a plurality of flight plates 14 (sludge scraper plates) which are provided so as to protrude to an outer side at predetermined distances in a length direction of the chain 42.

Further, as shown in FIG. 1, a link plate 44 (a side plate member) with attachment is coupled between inner link plates 18 in place of the other outer link plate 20 per several outer link plates in a length direction of the chain 42.

Figure 3A:
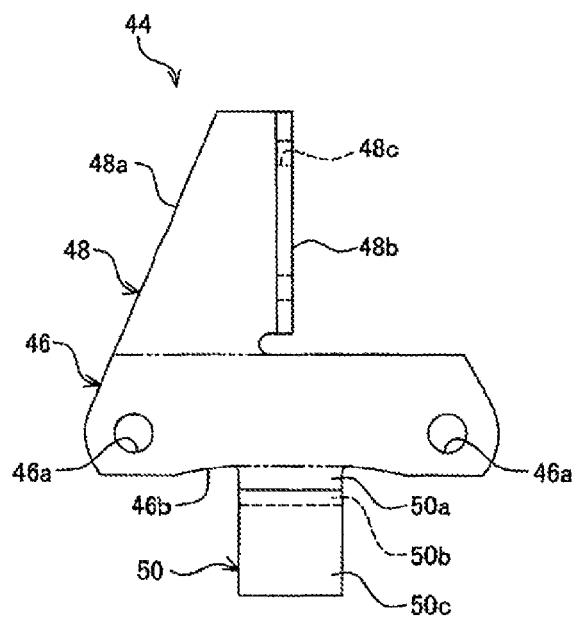

The link plate 44 of the chain structure 40 is constructed by a side plate portion 46, an attachment 48 (a flight plate attaching portion), and a protruding plate portion 50 (a drop preventing means), as shown in FIG. 3A. In FIG. 3A, the side plate portion 46, the attachment 48 and the protruding plate portion 50 are sectioned part by part with two-dot chain lines in the drawing for convenience of description, however, these elements are integrally and continuously formed.

The side plate portion 46 is formed as a plate shape having a length in a lateral direction of the drawing, as shown in FIG. 3A, and through holes 46a each of which loosely inserts a body portion 22a (refer to FIG. 16) of a coupling pin 22 for coupling to an inner link plate 18 are formed in both end portions in its length direction.

Further, in the side plate portion 46, an upper end portion in the drawing in its width direction (a vertical direction in FIG. 3A) is formed as a horizontally linear shape, and a lower end portion of the attachment 48 is integrally and continuously formed in a left portion in the drawing.

On the other hand, in the side plate portion 46, a concave portion 46b which is gently inclined upward in the drawing from both end portions in its horizontal direction toward a center portion is formed in a lower end portion in the drawing in a vertical direction of FIG. 3A, and an upper end portion of a protruding plate portion 50 (a drop preventing means) protruding downward in the drawing is integrally and continuously formed in a center portion in a horizontal direction of the concave portion 46b.

The attachment 48 is formed as an approximately triangular shape as shown in FIG. 3A, and is structured such as to have a rising portion 48a in which a lower end portion is integrally provided in a left upper end portion of the side plate portion 46, and an attaching portion 48b which is formed by a right end portion of the rising portion 48a being folded rectangularly from a paper surface of the drawing toward a near side.

Figure 3B:
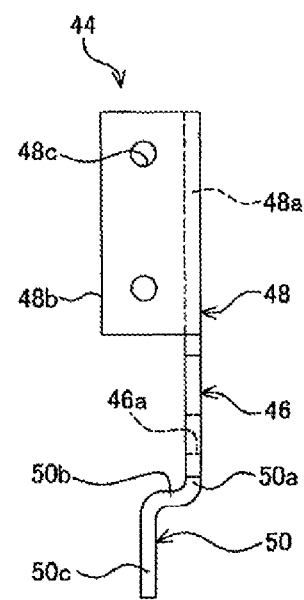

Two through holes 48c are formed in the attaching portion 48b of the attachment 48 so as to be spaced in a vertical direction of the drawing, as shown in FIG. 3B. These through holes 48c are arranged in a right side of the drawing of the attaching portion 48b of the attachment 48 via a spacer 30 as shown in FIG. 1, and are used for fixing the flight plate 14 formed its cross section as an approximately U-shaped form by a screw fastening means using bolts and nuts.

The protruding plate portion 50 of the one link plate 44 is structured, as shown in FIG. 3B, such as to have a base end plate portion 50a which protrudes out of a center portion in a horizontal direction of the concave portion 46b of the side plate portion 46 to a lower side of the drawing, an intermediate plate portion 50b which is folded vertically from a leading end portion of the base end plate portion 50a so as to extend in a horizontal direction, and a vertical plate portion 50c which is folded vertically (in a horizontal direction in a radial direction of the sprocket wheel 6) from a leading end portion of the intermediate plate portion 50b.

The link plate 44 is formed by folding one plate-like member at a plurality of positions as mentioned above. As a result, as shown in FIG. 2, the other link plate 44 which is used as a pair together with the one link plate 44 is changed its folding direction to an opposite side to the above, and a pair of link plates 44 which are faced to each other are formed as a plane symmetrical shape.

Further, a part in a length direction of the chain 42 in the chain structure 40 is wound around an outer peripheral portion of the gear teeth forming portion 6c of the sprocket wheel 6, as shown in FIG. 1.

In other words, as shown in FIG. 1, in the wound portion of the chain 42, a tooth top portion 6f of the sprocket wheel 6 is fitted to an air space portion S (refer to FIG. 16) which is constructed by the link plates 18 and 44 and the adjacent bushes 24, and the bush 24 is engaged with an engagement portion 6i which serves as a step portion between a tooth bottom portion 6h and the tooth top portion 6f of the sprocket wheel 6.

As shown in FIG. 2, the link plates 44 and 44 which are formed as the plane symmetrical shape in the chain 42 are arranged in both sides of a length in an axial direction of an annular projection portion 6d of the sprocket wheel 6.

At this time, the protruding plate portion 50 of the link plate 44 is arranged so that the intermediate plate portion 50b is faced to an outer peripheral surface in an upper side of the drawing of the annular projection portion 6d of the sprocket wheel 6, and is arranged so that a gap is provided between the intermediate plate portion 50b and the annular projection portion 6d of the sprocket wheel 6.

Further, the protruding plate portion 50 of the link plate 44 is folded so that a folded portion between the intermediate plate portion 50b and the vertical plate portion 50c extends along a profile of a cross section of the annular projection portion 6d of the sprocket wheel 6.

The vertical plate portion 50c of the protruding plate portion 50 of the link plate 44 is arranged so that its inner surface is faced to both end surfaces of a length in an axial direction of the annular projection portion 6d of the sprocket wheel 6, and is arranged so that a gap is provided between the vertical plate portion 50c and the both end surfaces of the annular projection portion 6d.

Further, the vertical plate portion 50c extends toward a lower side of the drawing, and is arranged so that its leading end portion extends to a position which is radially inner side than the annular projection portion 6d of the sprocket wheel 6.

Since the protruding plate portion 50 is formed in the link plate 44, the chain 42 according to the present embodiment is structured such that the chain 42 is hard to be detached from the gear tooth of the sprocket wheel 6 around which the chain is wound, in comparison with the chain 4 in the conventional chain structure 2.

Figure 4:
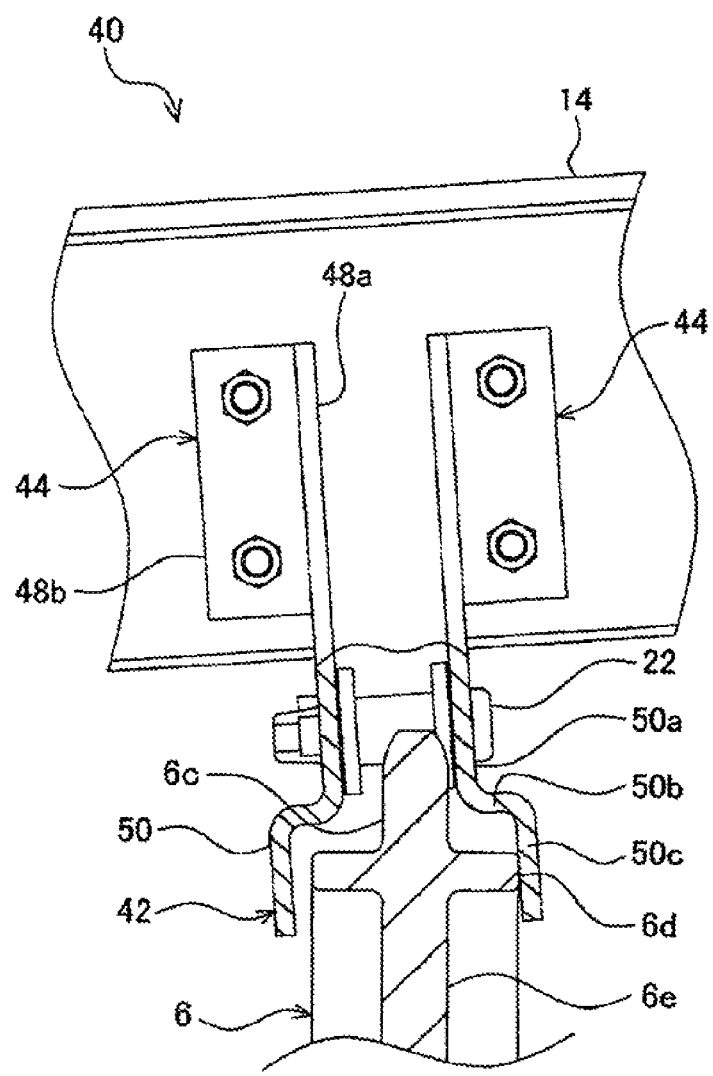
FIG. 4 is a view for explaining a motion of the link plate 44 in the chain structure 40, and is an enlarged side elevational view with a partial cross section showing one of sprocket wheels 6 shown in FIG. 2 together with its vicinity.

In other words, as shown in FIG. 4, even in the case that the chain 42 displaces in a vertical direction and a lateral direction so as to be moved to be detached from the gear teeth of the sprocket wheel 6, due to a great wave force which is generated by a great earthquake, the vertical plate portion 50c of the protruding plate portion 50 of the link plate 44 comes into contact with any end surface in the lateral direction of the drawing of the annular projection portion 6d of the sprocket wheel 6. As a result, the chain 42 is hard to be detached from the gear teeth of the sprocket wheel 6.

Further, in the chain 42 according to the present embodiment, after the portion which is nearly detached from the gear tooth forming portion 6c of the sprocket wheel 6 in the link plate 44 sustains on the basis of the contact, the link plates 44 are returned to the position of the gear tooth forming portion 6c of the sprocket wheel 6 and are engaged with each other back again.

In other words, in the chain 42 according to the present embodiment, since the protruding plate portion 50 of the link plate 44 is guided while coming into contact with the annular projection portion 6d of the sprocket wheel 6 when the chain 42 is wound around the sprocket wheel 6, the chain 42 is wound while being corrected its position in a width direction (an axial direction of the coupling pin 22) which is vertical to the length direction of the chain 42.

Accordingly, even if a traveling track of the chain 42 is somewhat deflected from a normal traveling track, the chain 42 can be returned to the normal traveling track by maintaining a contact between any end surface of the annular projection portion 6d of the sprocket wheel 6 and the protruding plate portion 50.

According to the chain structure 40 on the basis of the present embodiment mentioned above, it is possible to prevent the chain 42 from being detached from the gear tooth forming portion 6c of the sprocket wheel 6 due to the great wave force, and prevent the chain 42 and the flight plate 14 from dropping so as to break these members and the other portions of the chain structure 40.

Further, since the structure of the chain structure 40 according to the present embodiment is simple, it is possible to easily carry out a manufacturing work and an attaching work.

Further, since each of a pair of link plates 44 can be easily mass-produced by folding one plate-like member, a cost for one can be made lower.

Accordingly, as described above, according to the chain structure 40 on the basis of the present embodiment, the structure is simple, and it is possible to prevent the chain 42 from being detached from the gear tooth forming portion 6c of the sprocket wheel 6 due to the great wave force and prevent the chain 42 and the flight plates 14 from dropping so as to break these members and the other portions of the chain structure 40.

FIGS. 5 to 8 are views which are referred for explaining a chain structure 60 according to a second embodiment of the present invention.

Figure 5:
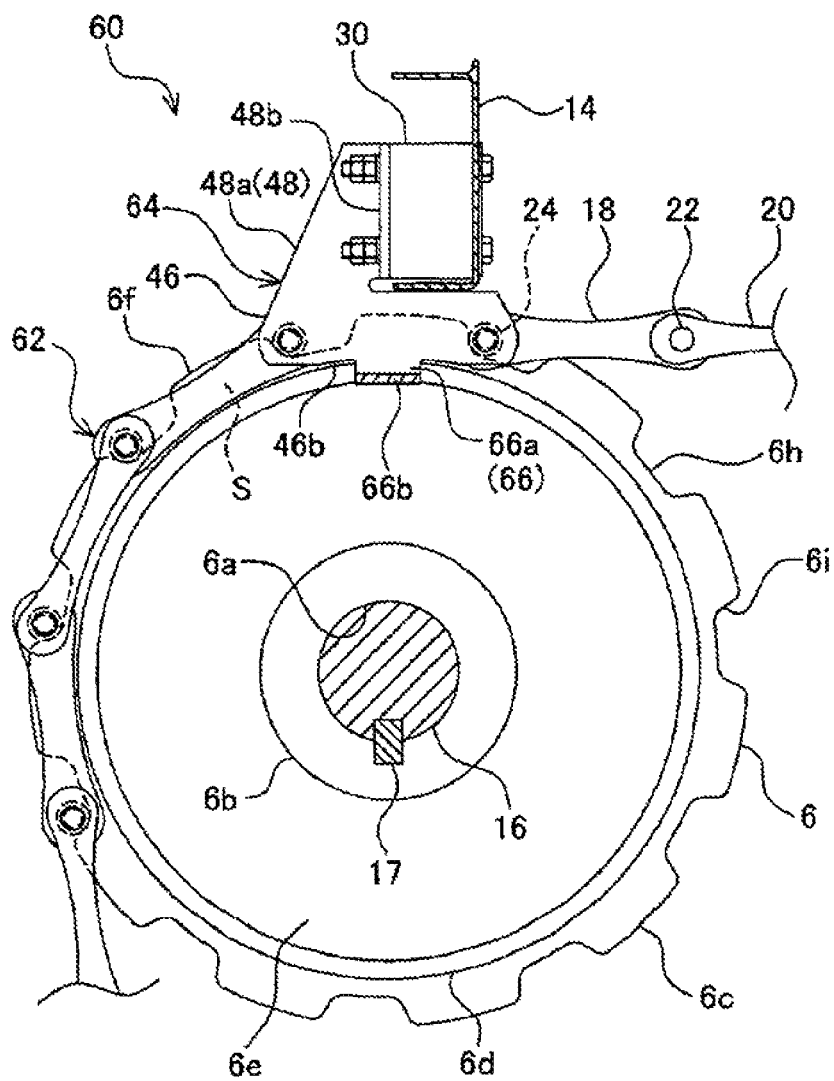
FIG. 5 is a front elevational view with a partial cross section showing a sprocket wheel 6 and its vicinity in a chain structure 60 according to a second embodiment of the present invention.
Figure 6:
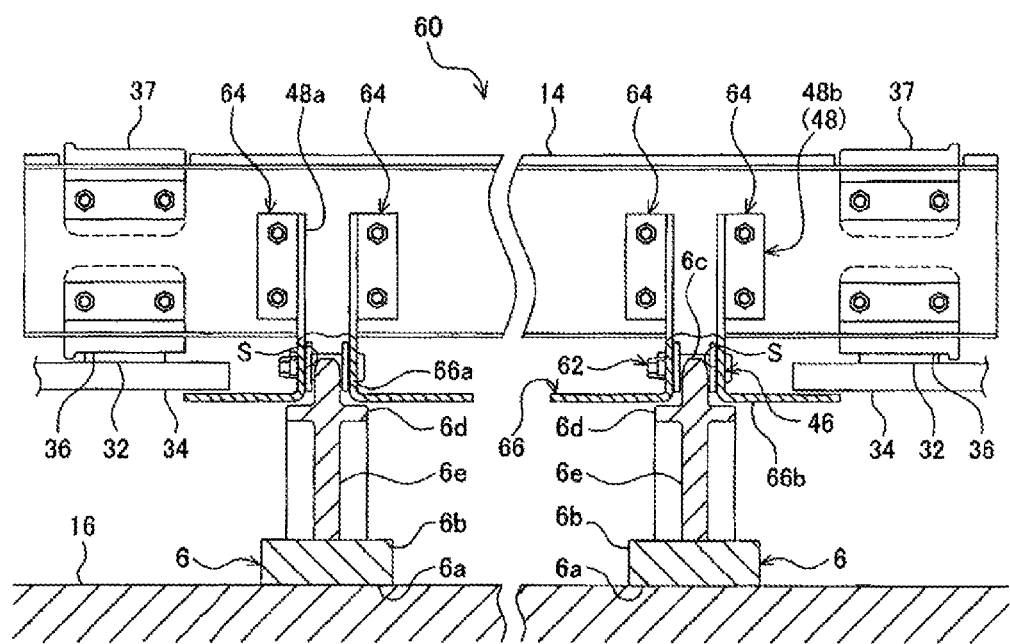
FIG. 6 is a side elevational view with a partial cross section showing in a partly broken manner a part of the chain structure 60 shown in FIG. 5, and is a view of the chain structure 60 as seen from a left side of FIG. 5.

A chain 62 in the chain structure 60 according to the present embodiment is different from the chain structure 40 according to the first embodiment in a point that a link plate 64 (a side plate member) is provided in place of the link plate 44 of the chain 42 in the chain structure 40 according to the first embodiment, as shown in FIGS. 5 and 6.

Figure 7A:
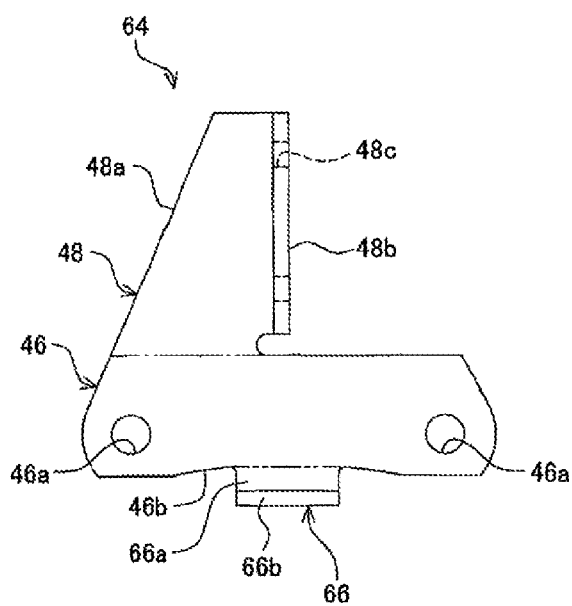
Figure 7B:
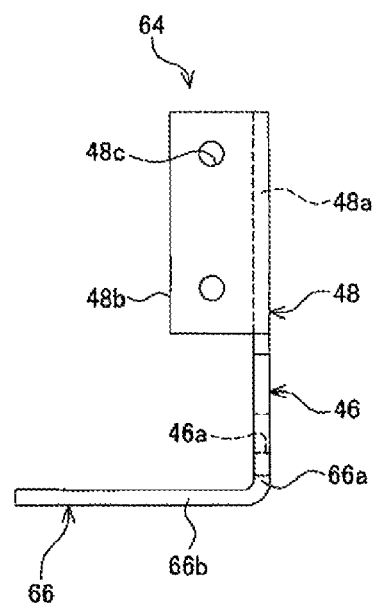

Further, the link plate 64 in the present embodiment is different from the chain structure 40 according to the first embodiment in a point that a protruding plate portion 66 (a drop preventing means) is provided in place of the protruding plate portion 50 of the link plate 44 in the first embodiment, as shown in FIGS. 7A and 7B.

The protruding plate portion 66 of the one link plate 64 is structured such as to be provided with a base end plate portion 66a which protrudes to a lower side in the drawing from a center portion in a horizontal direction of a lower side portion of the concave portion 46b of the side plate portion 46, and a horizontal plate portion 66b which is folded vertically in a lower end portion of the base end plate portion 66a so as to extend in a horizontal direction, as shown in FIG. 7B.

The link plate 64 in the present embodiment is formed by folding one plate-like member at a plurality of positions in the same manner as the link plate 44 in the first embodiment. As a result, as shown in FIG. 6, the other link plate 64 which is used as a pair together with the one link plate 64 is changed its folding direction to an opposite side to the above, and a pair of link plates 64 which are faced to each other are formed as a plane symmetrical shape.

Further, a part in a length direction of the chain 62 in the chain structure 60 is wound around an outer peripheral portion of the gear teeth forming portion 6c of the sprocket wheel 6, as shown in FIG. 5.

In other words, as shown in the drawing, in the wound portion of the chain 62, the tooth top portion 6f of the sprocket wheel 6 is fitted to the air space portion S (refer to FIG. 16) which is constructed by the link plates 18 and 64 and the adjacent bushes 24, and the bush 24 is engaged with the engagement portion 6i which serves as the step portion between the tooth bottom portion 6h and the tooth top portion 6f of the sprocket wheel 6.

As shown in FIG. 6, a pair of link plates 64 and 64 which are formed as the plane symmetrical shape in the chain 62 are arranged in both sides of the gear tooth forming portion 6c in such a manner as to sandwich the gear tooth forming portion 6c of the sprocket wheel 6 from outer sides in the axial direction.

At this time, the protruding plate portion 66 of the link plate 64 is arranged so that the horizontal plate portion 66b is faced to an outer peripheral surface in an upper side of the drawing of the annular projection portion 6d of the sprocket wheel 6, and is arranged so that a gap is provided between the horizontal plate portion 66b and the outer peripheral surface of the annular projection portion 6d.

Further, the horizontal plate portion 66b extending in the horizontal direction is arranged so that its leading end portion laps over the end portion in the sprocket wheel 6 side of the rail support member 34, is faced to a lower surface of the rail support member 34 in the drawing, and is arranged so that a gap is provided between the horizontal plate portion 66b and a lower surface.

Since the protruding plate portion 66 is formed in the link plate 64, the chain 62 according to the present embodiment is structured such that the chain 62 is hard to be detached from the gear teeth of the sprocket wheel 6 around which the chain is wound, in comparison with the chain 4 in the conventional chain structure 2.

Figure 8:
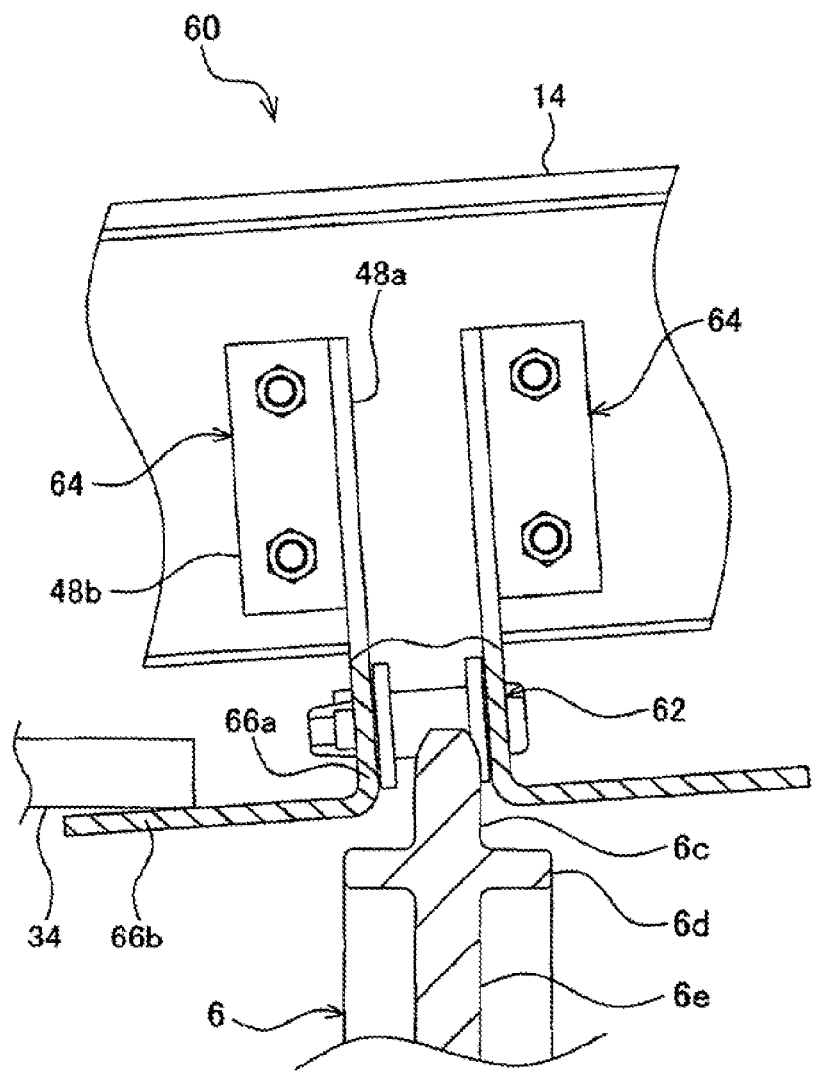
FIG. 8 is a view for explaining a motion of the link plate 64 in the chain structure 60, and is an enlarged side elevational view with a partial cross section showing one of sprocket wheels 6 shown in FIG. 6 together with its vicinity.

In other words, as shown in FIG. 8, even in the case that the chain 62 displaces in a vertical direction and a lateral direction so as to be moved to be detached from the gear teeth of the sprocket wheel 6, due to a great wave force which is generated by a great earthquake, the leading end portion of the horizontal plate portion 66b of the protruding plate portion 66 of the link plate 64 comes into contact with the lower surface of the end portion of the rail support member 34. As a result, the chain 62 is hard to be detached from the gear teeth of the sprocket wheel 6.

According to the chain structure 60 on the basis of the second embodiment of the present invention as mentioned above, the structure is simple, and it is possible to prevent the chain 62 from being detached from the gear tooth forming portion 6c of the sprocket wheel 6 due to the great wave force, and prevent the chain 62 and the flight plate 14 from dropping so as to break these members and the other portions of the chain structure 60, in the same manner as the chain structure 40 according to the first embodiment.

Figure 9:
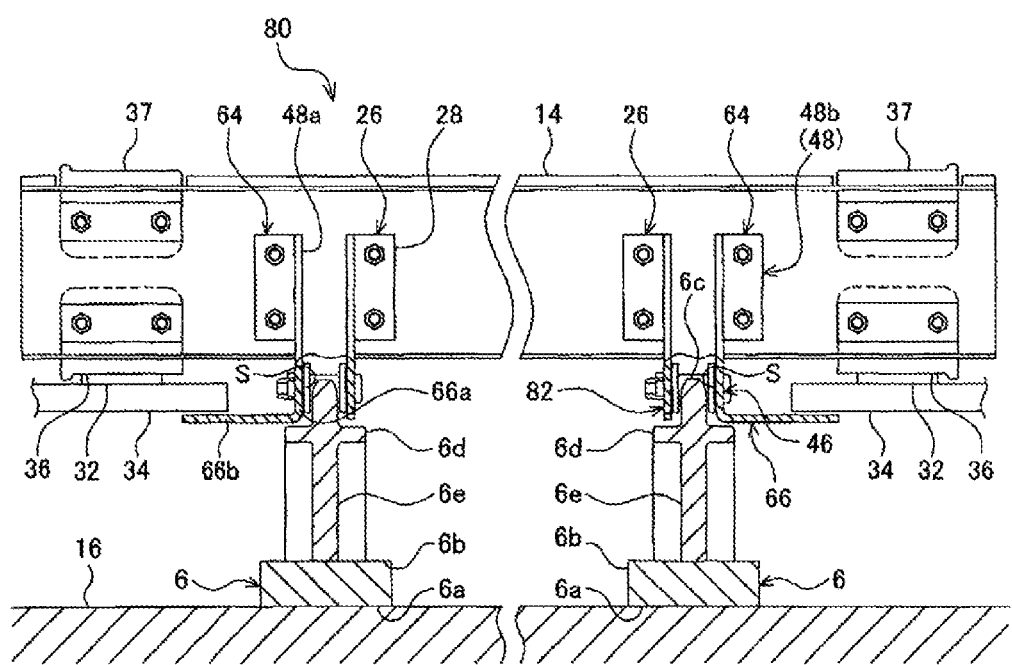
FIG. 9 is a view showing a chain structure 80 according to a third embodiment of the present invention and corresponding to FIGS. 2 and 6, and is a side elevational view with a partial cross section showing in a partly broken manner a part of the chain structure 80.

FIG. 9 is a view which is referred for explaining a chain structure 80 according to a third embodiment of the present invention.

A chain 82 in the chain structure 80 according to the present embodiment is structured, as shown in FIG. 9, such that the same link plate 64 as that in the second embodiment is arranged in one in an axial direction of the annular projection portion 6d of the sprocket wheel 6, and the same link plate 26 of the chain 4 as that in the conventional chain structure 2 is arranged in the other.

Further, the link plate 26 of the chain 82 is arranged in each of sides which are faced to each other in a pair of sprocket wheels 6 and 6, and the link plate 64 of the chain 82 is arranged in an opposite side to each of the sides which are faced to each other in a pair of sprocket wheels 6 and 6.

In the chain 82 in the present embodiment, since the protruding plate portion 66 (the drop preventing means) is provided in a pair of link plates 64 which are arranged in the opposite sides to the sides which are faced to each other of a pair of sprocket wheels 6 and 6, the chain 82 is structured such as to be hard to be detached from the gear teeth of the sprocket wheel 6 around which the chain 82 is wound, in comparison with the chain 4 in the conventional chain structure 2.

In other words, in the same manner as the chain 62 in the second embodiment shown in FIG. 8, even in the case that the chain 82 displaces in a vertical direction and a lateral direction so as to be moved to be detached from the gear teeth of the sprocket wheel 6, due to a great wave force which is generated by a great earthquake, the leading end portion of the horizontal plate portion 66b of the protruding plate portion 66 of the link plate 64 comes into contact with the lower surface of the end portion of the rail support member 34. As a result, the chain 82 is hard to be detached from the gear teeth of the sprocket wheel 6.

According to the chain structure 80 on the basis of the third embodiment of the present invention as mentioned above, the structure is simple, and it is possible to prevent the chain 82 from being detached from the gear tooth forming portion 6c of the sprocket wheel 6 due to the great wave force, and prevent the chain 82 and the flight plate 14 from dropping so as to break these members and the other portions of the chain structure 80, in the same manner as the chain structure 40 according to the first embodiment.

Figure 10:
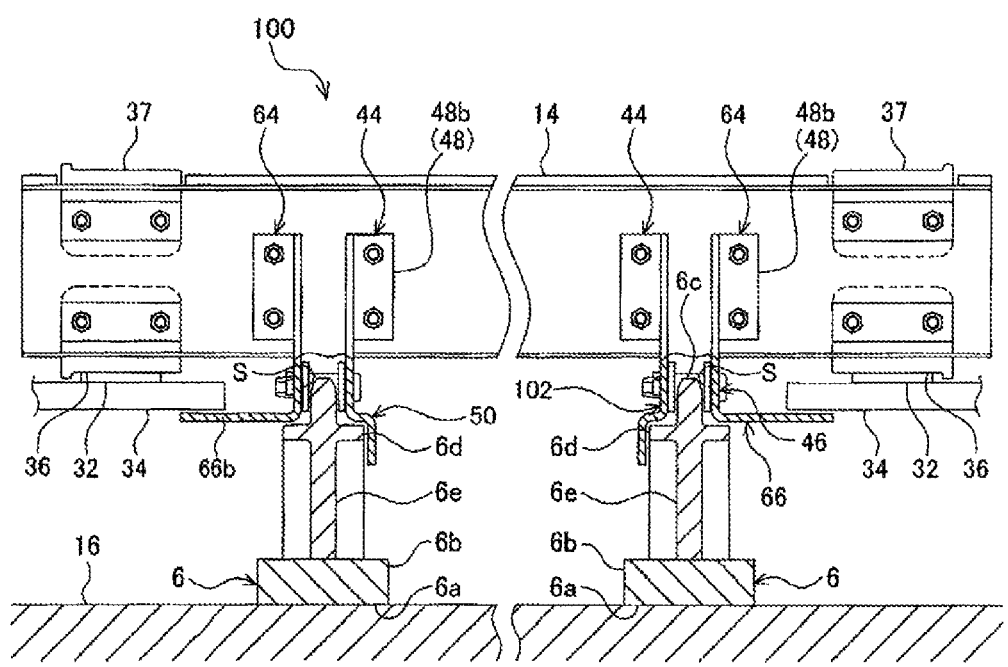
FIG. 10 is a view showing a chain structure 100 according to a fourth embodiment of the present invention and corresponding to FIGS. 2 and 6, and is a side elevational view with a partial cross section showing in a partly broken manner a part of the chain structure 100.

FIG. 10 is a view which is referred for explaining a chain structure 100 according to a fourth embodiment of the present invention.

A chain 102 in the chain structure 100 according to the present embodiment is structured, as shown in FIG. 10, such that the same link plate 64 as that in the second embodiment is arranged in one in a length direction of an axis of the annular projection portion 6d of the sprocket wheel 6, and the same link plate 44 as that in the first embodiment is arranged in the other.

Further, the link plate 44 of the chain 102 is arranged in each of sides which are faced to each other in a pair of sprocket wheels 6 and 6, and the link plate 64 of the chain 102 is arranged in an opposite side to each of the sides which are faced to each other in a pair of sprocket wheels 6 and 6.

In the chain 102 in the present embodiment, since the protruding plate portion 50 (the drop preventing means) is formed in a pair of link plates 44 which are arranged in the sides which are faced to each other of a pair of sprocket wheels 6 and 6, and the protruding plate portion 66 (the drop preventing means) is formed in a pair of link plates 64 which are arranged in the opposite sides to the sides which are faced to each other, the chain 102 is structured such as to be hard to be detached from the gear teeth of the sprocket wheel 6 around which the chain 102 is wound, in comparison with the chain 4 in the conventional chain structure 2.

In other words, even in the case that the chain 102 displaces in a vertical direction and a lateral direction so as to be moved to be detached from the gear teeth of the sprocket wheel 6, due to a great wave force which is generated by a great earthquake, the vertical plate portion 50c of the protruding plate portion 50 of the link plate 44 comes into contact with any end surface in the lateral direction of the drawing in the annular projection portion 6d of the sprocket wheel 6, or the leading end portion of the horizontal plate portion 66b of the protruding plate portion 66 of the link plate 64 comes into contact with the lower surface of the end portion of the rail support member 34. As a result, the chain 102 is hard to be detached from the gear teeth of the sprocket wheel 6.

According to the chain structure 100 on the basis of the fourth embodiment of the present invention as mentioned above, the structure is simple, and it is possible to prevent the chain 102 from being detached from the gear tooth forming portion 6c of the sprocket wheel 6 due to the great wave force, and prevent the chain 102 and the flight plate 14 from dropping so as to break these members and the other portions of the chain structure 100, in the same manner as the chain structure 40 according to the first embodiment.

Figure 11:
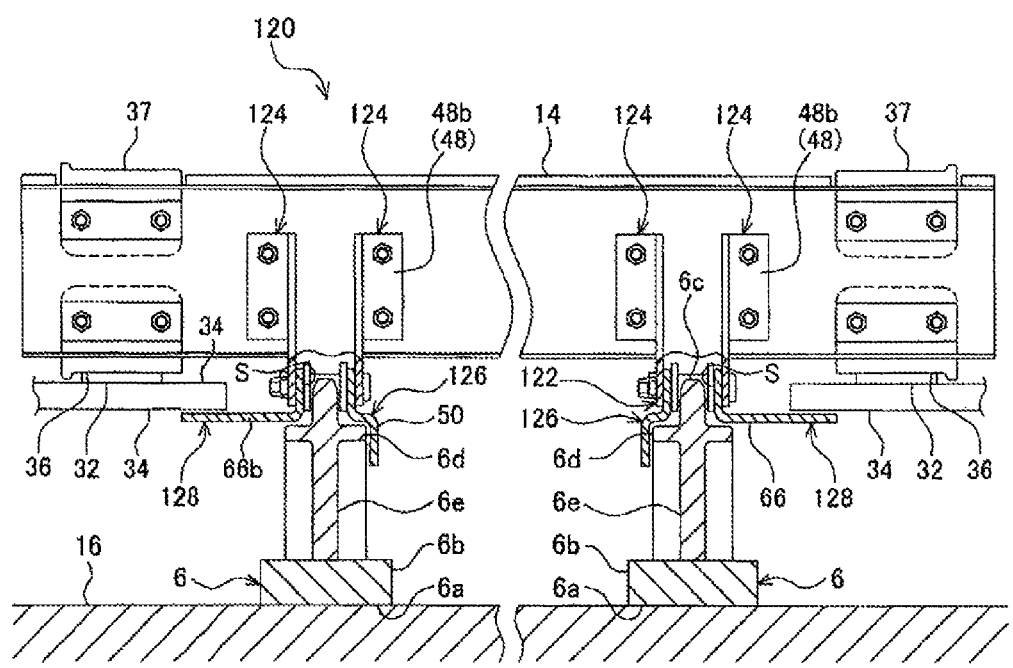
FIG. 11 is a view showing a chain structure 120 according to a fifth embodiment of the present invention and corresponding to FIG. 10, and is a side elevational view with a partial cross section showing in a partly broken manner a part of the chain structure 120.

FIGS. 11 to 13 are views which are referred for explaining a chain structure 120 according to a fifth embodiment of the present invention.

A chain 122 in the chain structure 120 according to the present embodiment is structured, as shown in FIG. 11, such that a protruding plate member 126 (a side plate member) is arranged in one in a length direction of the axis of the annular projection portion 6d of the sprocket wheel 6, and a protruding plate member 128 (a side plate member) is arranged in the other. A lower end portion in the drawing of a link plate 124 (a side plate member) is arranged in each of opposite sides (outer sides) to the gear tooth forming portion 6c in relation to upper end portions in the drawing of each of the protruding plate members 126 and 128, in the length direction of the axis of the annular projection portion 6d of the sprocket wheel 6.

Further, the link plate 124 and the protruding plate member 126 of the chain 122 are arranged in sides which are faced to each other in a pair of sprocket wheels 6 and 6, and the link plate 124 and the protruding plate member 128 of the chain 122 are arranged in opposite sides to the sides which are faced to each other in a pair of sprocket wheels 6 and 6.

The link plate 124 of the chain structure 120 is constructed by the side plate portion 46 and the attachment 48 (the flight plate attaching portion) of the link plate 44 in the first embodiment, as shown in FIGS. 12A, 12B, 13A and 13B. Here, in FIGS. 12A and 13A, the side plate portion 46 and the attachment 48 are sectioned part by part with a two-dot chain line in the drawings for convenience of explanation, in the same manner as FIG. 3, however, they are integrally and continuously formed.

Figure 12A:
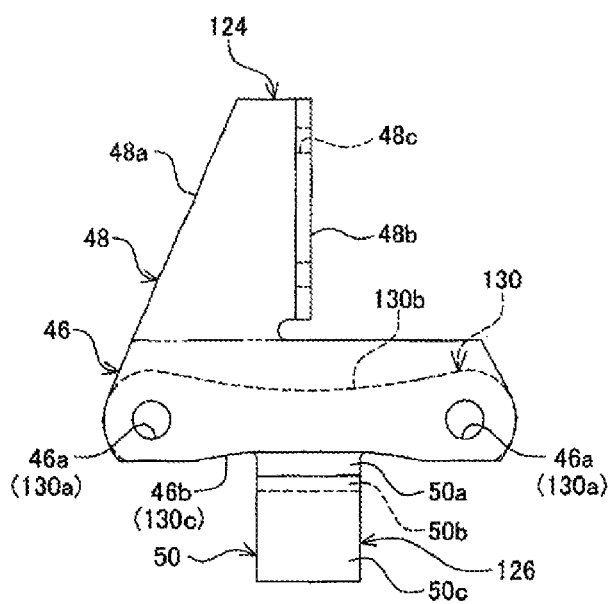
Figure 12B:
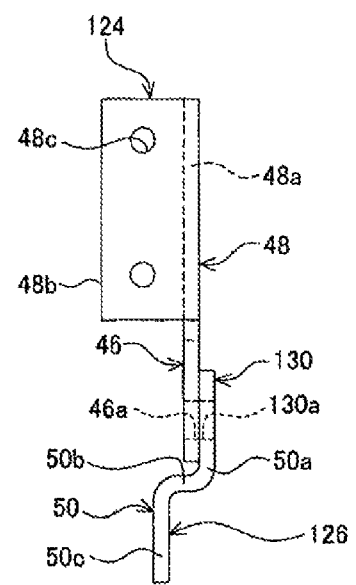

The protruding plate member 126 of the chain structure 120 is constructed by a side plate portion 130 which is formed as the same outer shape as the outer link plate 20 in the conventional chain structure 2, and a protruding plate portion 50 (a drop preventing means) which is formed as the same outer shape as the protruding plate portion 50 of the link plate 44 in the first embodiment, as shown in FIGS. 12A and 12B.

The side plate portion 130 of the protruding plate member 126 is formed as a plate shape having a length in a lateral direction in the drawing, as shown in FIG. 12A, and through holes 130a each of which loosely inserts the body portion 22a (refer to FIG. 16) of the coupling pin 22 for coupling to the inner link plate 18 are formed at positions which are communicated with the through holes 46a of the link plate 124, in both end portions in its length direction.

In the side plate portion 130, concave portions 130b and 130c which are gently inclined inward in a width direction from both end portions in a horizontal direction toward a center portion are formed in an upper end portion and a lower end portion in the drawing in a width direction (a vertical direction in FIG. 12A).

Further, an upper end portion of the protruding plate portion 50 protruding downward in the drawing is integrally and continuously formed in a center portion in a horizontal direction of the concave portion 130c of the side plate portion 130.

The protruding plate member 128 of the chain structure 120 is constructed by a side plate portion 130 which is formed as the same outer shape as the side plate portion 130 in the protruding plate member 126, and the same protruding plate portion 66 (a drop preventing means) as the protruding plate portion 66 of the link plate 64 in the second embodiment, as shown in FIGS. 13A and 13B.

In other words, the protruding plate member 128 is formed such that its upper end portion is integrally and continuously formed in a center portion in a horizontal direction of the concave portion 130c of the side plate portion 130, and its lower end portion is protruded to a lower side of the side plate portion 130 and is folded in a horizontal direction to form the protruding plate portion 66.

As shown in FIG. 11, the link plate 124, the protruding plate members 126 and 128 of the chain structure 120 may be formed as plane symmetrical shapes to the shapes shown in FIGS. 12 and 13, in the same manner as the link plate 44 in the first embodiment.

The chain structure 120 according to the present embodiment is constructed by an independent member from the link plate 124, and the protruding plate member 126 or 128, as is different from the chain structure 40 according to the first embodiment.

Further, as shown in FIG. 11, since the body portion 22a of the coupling pin 22 is inserted to the through hole 46a of the link plate 124 and the through hole 130a of the protruding plate member 126 or 128, the link plate 124 and the protruding plate member 126 or 128 are coupled to each other, and are integrally provided in the chain 122 like the chain 42 in the first embodiment shown in FIG. 1.

According to the chain structure 120 on the basis of the fifth embodiment of the present invention as mentioned above, it is possible to prevent the chain 122 from being detached from the gear tooth forming portion 6c of the sprocket wheel 6 due to the great wave force, and prevent the chain 122 and the flight plate 14 from dropping so as to break these members and the other portions of the chain structure 120, on the basis of the same operations as the chain structures 40 and 60 according to the first and second embodiments.

Figure 16A:
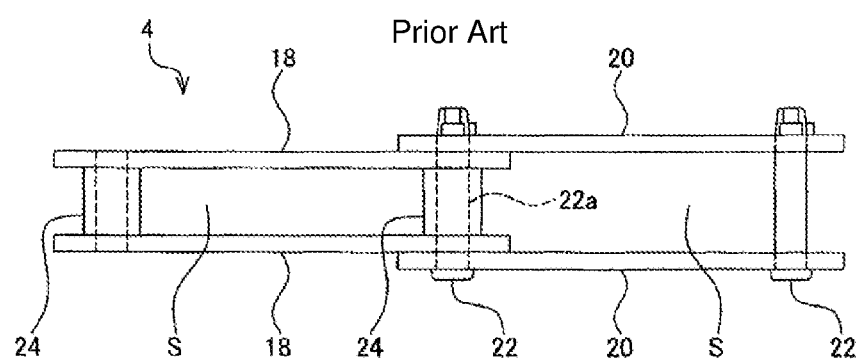
Figure 16B:
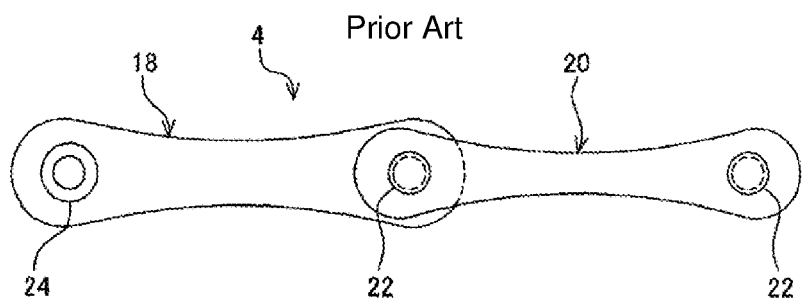

In the chain structure 40 according to the first embodiment, since the flight plate 14 is fixed to the attachment 48, it is desirable to form the protruding plate portion 50 in the link plate 44 with attachment which is particularly easily affected by the wave, however, the protruding plate portion 50 may be provided in the other link plates, for example, the inner and outer link plates 18 and 20 shown in FIG. 16 and provided with no attachment 48.

Further, in the chain structure 40 according to the first embodiment, the link plate 44 is integrally constructed by the side plate portion 46, the attachment 48 and the protruding plate portion 50, however, these portions may be separated into individual parts without being integrally constructed as the fifth embodiment, and these parts may be integrally fixed on the basis of a screw fastening.

Further, in the chain structure 60 according to the second embodiment, in the case that the chain 62 displaces in the vertical direction and the lateral direction and moves so as to be detached from the gear teeth of the sprocket wheel 6, due to the great wave force which is generated by the great earthquake, the leading end portion of the horizontal plate portion 66b of the protruding plate portion 66 of the link plate 64 is structured such as to come into contact with the lower surface of the rail support member 34, however, the leading end portion may come into contact with a lower surface of the other stationary member which is provided within the sewage disposal tank 3, without being limited to the rail support member 34.

Further, in the chain structure 120 according to the fifth embodiment, the link plate 124 and the protruding plate member 126, and the link plate 124 and the protruding plate member 128 are coupled to each other by the coupling pin 22, however, the link plate 124 and the protruding plate member 126, and the link plate 124 and the protruding plate member 128 may be integrally coupled by being screw fastened to each other, or according to the other method, for example, a welding method.

Figure 19:
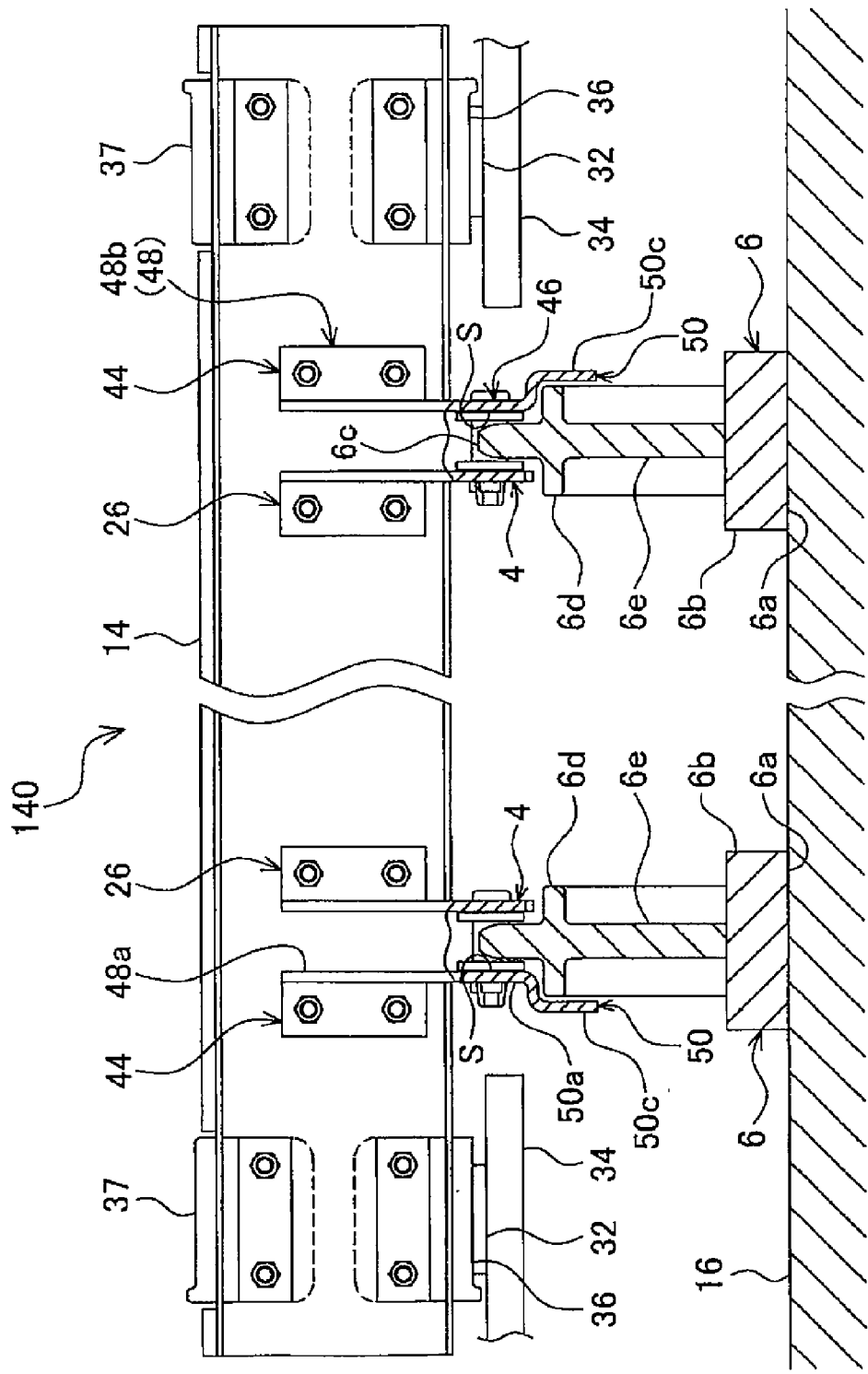
FIG. 19 is a side elevation view with a partial cross section showing in a partly broken manner a part of the chain structure 140.
Figure 20:
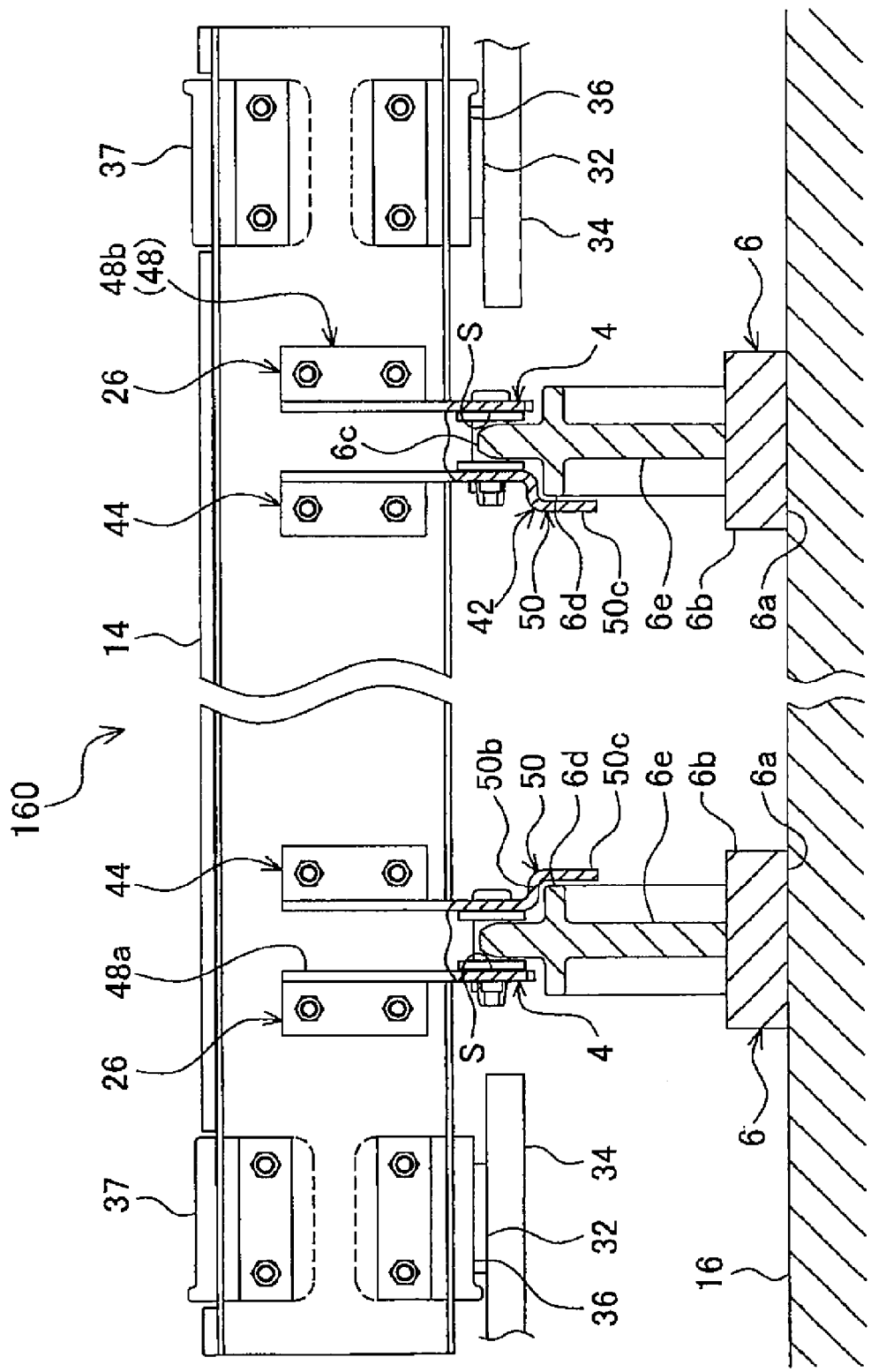
FIG. 20 is a side elevation view with a partial cross section showing in a partly broken manner a part of the chain structure 160.

FIG. 19 illustrates a chain structure 140 wherein the protruding plate portion 50 is provided only in the side plate members 44 which are arranged in the sides which are faced to each other of a pair of sprocket wheels 6. FIG. 20 illustrates a chain structure 160 wherein the protruding plate portion 50 is provided only in the side plate members which are arranged in the opposite sides to the sides which are faced to each other of a pair of sprocket wheels 6.

Further, the respective structures of the chain structures 40 according to the first to fifth embodiments may be appropriately combined, and a chain structure which is different from these embodiment may be constructed.

For example, the chain 82 in the chain structure 80 according to the third embodiment is structured such that the link plate 64 is arranged only in the opposite side to the sides which are faced to each other in the sprocket wheel 6, however, the link plate 44 according to the first embodiment may be alternatively arranged. Further, the link plate 64 and the link plate 44 may be arranged only in the sides which are faced to each other, in place of the opposite side to the sides which are faced to each other in the sprocket wheel 6.

Further, in the case that the link plate 44 is arranged only in the sides which are faced to each other in the sprocket wheel 6, or only in the opposite side to the sides which are faced to each other, the link plate 26 may be arranged in the opposite side of the link plate 44.

Further, in the case that the link plate 64 is arranged only in the sides which are faced to each other in the sprocket wheel 6, the link plate 26 may be arranged in the opposite side of the link plate 64.

Further, in the case that the link plate 64 is arranged in the sides which are faced to each other in the sprocket wheel 6, the link plate 64 may be structured such as to come into contact with the lower surface of the other stationary member which extends vertically from a wall surface (not shown) of the sewage disposal tank 3 to sides which are faced to each other in a pair of sprocket wheels 6 and 6.

Further, the rail member 32 according to the conventional embodiment is provided between the sprocket wheels 6 and 12 as shown in FIG. 14, however, may be provided at the other positions. For example, the chain 4 between the sprocket wheels 12 and 10 may be arranged so as to extend linearly, and the rail member 32 may be provided along the linearly extending chain 4.

Further, in the embodiments according to the present invention, the description is given of the case that the present invention is applied to the sprocket wheel 6 in which the annular projection portion 6d is formed, however, the present invention may be applied to a sprocket wheel in which the annular projection portion 6d is not formed.

What is claimed is:

1. A chain structure comprising:
a sprocket wheel in which a plurality of gear teeth capable of engaging with a chain are formed in an outer peripheral portion; and
the chain in which a pair of side plate members facing to each other are coupled in an endless manner at plural sets in a length direction, and which is wound around gear teeth in the outer peripheral portion of said sprocket wheel,
wherein a protruding plate portion for preventing the side plate member from dropping from a wound state to the sprocket wheel is provided in at least a part of the plural sets of said side plate members,
wherein said protruding plate portion includes a base end plate portion which protrudes out of a center portion of the side plate portion in a longitudinal direction so as to extend in a radially inward direction of the sprocket wheel, an intermediate plate portion which is folded from a leading end portion of the base end plate portion so as to extend in a direction that goes away from the paired side plate portions, and a vertical plate portion which is folded from a leading end portion of the intermediate plate portion so as to extend in the radially inward direction of the sprocket wheel, and
wherein said side plate member is configured such that a portion of the sprocket wheel side except for the portion where said protruding plate portion is provided is located radially more outward than the intermediate plate portion.

2. The chain structure according to claim 1, wherein said protruding plate portion is provided in said side plate member having a flight plate attaching portion.

3. The chain structure according to claim 2, wherein two sets of chain structures are arranged in inner sides of a pair of surfaces facing to each other within a liquid tank so as to be faced to each other, and
said protruding portions are provided only in the side plate members which are arranged in the sides which are faced to each other of a pair of sprocket wheels, or only in the side plate members which are arranged in the opposite sides to the sides which are faced to each other of a pair of sprocket wheels.

4. The chain structure according to claim 1, wherein two sets of chain structures are arranged in inner sides of a pair of surfaces facing to each other within a liquid tank so as to be faced to each other, and
said protruding portions are provided only in the side plate members which are arranged in the sides which are faced to each other of a pair of sprocket wheels, or only in the side plate members which are arranged in the opposite sides to the sides which are faced to each other of a pair of sprocket wheels.

5. The chain structure according to claim 1, wherein an annular projection portion is formed in an inner side in the radial direction than the gear tooth forming portion of the sprocket wheel, said annular projection portion protruding in a thickness direction of said sprocket wheel, and having its axis in common with the axis of said sprocket wheel to be formed in a circular ring shape,
wherein said intermediate plate portion and said vertical plate portion are arranged to be faced to an outer peripheral surface of the annular projection portion with a gap therebetween, and
wherein the vertical plate portion is arranged so that its leading end portion extends to a position which is radially inner side than the annular projection portion of the sprocket wheel.

6. A chain structure comprising:
a chain;
a sprocket wheel having a plurality of gear teeth formed in an outer peripheral portion and configured to engage the chain;
a pair of symmetrical link plates arranged on opposite sides of the chain, wherein each link plate includes a side plate portion configured to couple to the chain, a flight plate attaching portion extending from a first side of the side plate portion, and a protruding plate portion extending from an opposite second side of the side plate portion;
wherein the flight plate attaching portion includes a rising portion integrally provided on an upper end portion of the first side of the side plate portion, and an attaching portion extending perpendicularly from the rising portion; and wherein the protruding plate portion includes a base end plate portion extending out from a part of the respective side plate member, an intermediate plate portion extending perpendicularly from the base end plate portion, and a vertical plate portion extending perpendicularly from the intermediate plate portion.

7. The chain structure according to claim 6, wherein the side plate portion comprises an upper end portion formed as a horizontally linear shape and a lower end portion having a concave portion formed at the center.

8. The chain structure according to claim 7, wherein the protruding plate portion is integrally and continuously formed in the center portion of the concave portion and protrudes downward from the concave portion.

* * * * *